Dec. 6, 1966 I. G. AKMENKALNS 3,290,517

THRESHOLD LOGIC CIRCUITRY PRODUCING OUTPUT ON AMPLITUDE COINCIDENCE

Filed Oct. 31, 1963

INVENTOR

IVARS G. AKMENKALNS

BY J. Jancin Jr.

ATTORNEY

United States Patent Office 3,290,517
Patented Dec. 6, 1966

3,290,517

THRESHOLD LOGIC CIRCUITRY PRODUCING OUTPUT ON AMPLITUDE COINCIDENCE

Ivars G. Akmenkalns, Endicott, N.Y., assignor to International Business Machines Corporation, New York, N.Y., a corporation of New York Filed Oct. 31, 1963, Ser. No. 320,444
5 Claims. (Cl. 307—88.5)

This invention relates to threshold logic circuitry. More particularly, it relates to improved threshold logic circuitry employed in threshold, or adaptive, logic systems. The term "threshold logic" as employed hereinafter connotes electronic circuitry which can compare the sum of a plurality of quantities with a reference quantity, and indicate whether or not an equality exists.

Prior art threshold logic circuits have usually employed electrical currents to represent the quantities summed; such circuits necessarily required a low impedance, current sensitive, threshold detector. When attempts have been made to use voltages for summing instead of current summing, it has been necessary to provide a high impedance, voltage sensitive, threshold detector circuit. Threshold logic circuits known to the prior art have also been plagued with an inability to provide an instantaneous indication that equality has occurred between the quantities being matched when the difference between the quantities is small; an undecided, or confused, state has been exhibited in such circuitry. Further, past circuits have normally been designated to perform a subtract operation, rather than a comparison function; the subtract operation reduces the circuit tolerance in all phases of operation. A still further problem encountered in prior art devices is that the switching time of the threshold logic circuits increases as the quantity being compared approaches the reference quantity; a resultant substantial overdrive signal is required in order to maintain fast switching speeds.

Accordingly, it is a general object of this invention to provide an improved threshold logic circuit which obviates these problems.

It is another object of this invention to provide an improved threshold logic circuit wherein the quantities to be compared are represented by voltages.

Another object of this invention is to provide a threshold logic circuit wherein the equality determination is effected by a comparison of the summed input voltages with a time-varying reference voltage.

A further object of this invention is to provide improved threshold logic circuitry wherein quantities approaching the reference quantity can be detected with more certainty than prior art devices afforded.

A still further object of the invention is to provide threshold logic circuitry which operates at fast switching speeds absent a high signal overdrive, even when sensing a summed quantity of approximately the same value as the reference quantity.

Briefly stated, and in accordance with one aspect of the invention, I provide threshold logic circuitry in which a voltage varying linearly with time is compared with a voltage representing a particular sum of input voltages so as to produce an output signal when both voltages are equal. A voltage summing network, which receives a plurality of binary input signals, is diode coupled to a nodal point. The time-varying, or ramp, voltage is also diode coupled to the nodal point. A detector circuit, comprising a capacitively coupled tunnel diode and an output transistor, is also coupled to the nodal point. Until an equality occurs between the summed input voltage and the time-varying reference voltage, the constant summed voltage is available at the nodal point. When an equality between the summed input voltage and the time-varying voltage occurs, the diode associated with the voltage summing network becomes reverse biased, allowing the time-varying voltage to pass through its associated diode to the nodal point. The time-varying voltage then switches the capacitively coupled tunnel diode to its higher conducting state, thereby driving on the output transistor.

In accordance with another aspect of the invention, an arrangement utilizing a plurality of such threshold logic circuits is provided. This arrangement employs a "one only" type of single shot during each cycle of operation to gate the outputs from the associated threshold logic circuit to output latch circuits; gating occurs only during activation of the single shot. Other circuitry, not a part of this invention, is employed to sort the outputs occurring during the single shot activation. When the single shot is turned off, further outputs from threshold logic circuits are not gated to the output latch circuits. This arrangement can find application in an environment where it is desired to recognize a condition first occurring from a plurality of similar conditions occurring later.

The circuitry of this invention has certain advantages over prior art circuits. One such advantage is that it provides a reliable determination of equality between the summed input voltages and the linearly time-varying reference voltage. It does this without necessitating a high impedance threshold detector circuit. The high speed response of the tunnel diode enables the output transistor to switch at essentially the same time that the equality condition is discovered. Further, the precise operating tolerances of the circuitry are preserved by performing a comparison operation with separate circuit components, thereby obviating the difficulty in maintaining tolerances encountered in prior art circuits. The particular arrangement of components also guarantees that the output, or detector, circuit will be driven by a carefully controlled voltage (namely, the linearly time-varying voltage) in every instance. As a corollary to this, uniform switching speeds are more readily maintained than in prior art circuits, regardless of the summed input voltage magnitudes. The net advantage presented by this invention is a reliable, economical threshold logic circuit, which is better suited than prior art devices for employment in digital data processing equipment.

The foregoing and other objects, features and advantages of the invention will be apparent from the following more particular description of preferred embodiments of the invention as illustrated in the accompany drawings.

Figure 1:
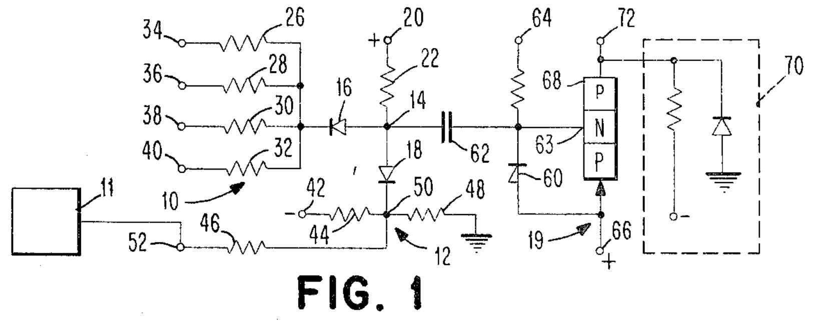
FIG. 1 shows the basic threshold logic circuit.

Referring generally to FIG. 1, the necessary components for a threshold logic circuit are shown. A voltage summing network 10 is connected to a nodal point 14. A ramp signal, or sawtooth, voltage generator 11 in series with a voltage dividing network 12 is also connected to nodal point 14. The ramp signal voltage generator may be any type well known in the art; for example, any one of the ramp signal voltage generators shown in Chapter 14 of "Transistor Switching Circuits" by Joyce and Clarke, published in 1961 by Addison-Wesley, would be satisfactory. The generator should supply a voltage varying linearly with time; the amplitude of that voltage should decrease as time increases. Further, the amplitude of the ramp signal should cover a range sufficient to include all values of the summed voltage. Both voltage summing network 10 and voltage divider 12 have associated diodes 16 and 18 interposed respectively between them and nodal point 14. A threshold, or equality, detector circuit 19 is connected to the opposite side of nodal point 14 so as to provide an output signal upon detecting an equality condition. A source of constant potential 20 is coupled through resistor 22 to nodal point 14.

In order to sum a plurality of input voltages into a single constant $V_S$, voltage summing network 10 comprises a plurality of parallel-wired elements 26, 28, 30, 32. Input terminals 34, 36, 38, 40 are respectively connected to each resistive element 26, 28, 30, 32 so as to receive a set of impressed input voltages during each cycle of operation. The single summed voltage $V_S$ is present at the cathode of diode 16.

In order to provide a linearly time-varying reference voltage, a ramp signal, or sawtooth, voltage generator 11 is included in the circuitry. Voltage divider 12 constitutes a resistive attenuating network. A constant potential source 42, negative with respect to the reference potential, is supplied through resistor 44 to a common point 50. A sawtooth voltage from signal generator 11 is applied to terminal 52. Through the coaction of additional resistive elements 46, 48, a time-varying potential $V_R$ is made available at common point 50. Discrete changes in resistive elements 44, 46, 48 may be made to control the characteristics of the time-varying voltage $V_R$. $V_R$ is thus developed during each cycle of machine operation and supplied to the cathode of diode 18.

Detector circuit 19 is provided in order to sense when an equality condition has arisen between $V_S$, available from voltage summing network 10, and $V_R$, available from ramp signal generator 11 and voltage divider 12. The basic components of detector circuit 19 are few in number. A tunnel diode 60 is coupled by means of capacitor 62 to nodal point 14. Tunnel diode 60 is cyclically placed in the lower of its two voltage states by means of a reset voltage applied at terminal 64, but it is biased to a point just below its peak current, operating region. The reset voltage is applied once during every cycle of machine operation. Tunnel diode 60 is also connected between the base terminal 63 and the emitter terminal 66 of transistor 68. A positive potential is supplied to terminal 66. Transistor 68 is connected to diode-resistor network 70 and output terminal 72.

Thus far, the components shown in FIG. 1 have been enumerated. Certain necessary operating potentials have been set forth, and the basic function of each major component group has been recited. It is now necessary to examine the unified operation of these components.

Figure 2:
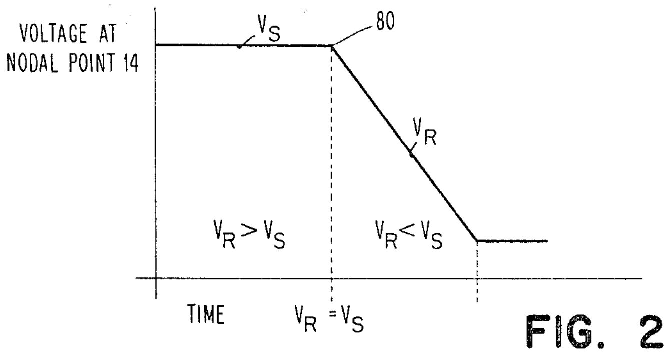
FIG. 2 is a plot of voltage versus time at a given point in the circuit of FIG. 1.

By way of example, the operation of the electronic circuitry shown in FIG. 1 will be described. Reference will also be made to FIG. 2, which is a plot of voltage versus time at nodal point 14. A plurality of input voltage signals are impressed on terminals 34, 36, 38, 40 of voltage summing network 10. The summed voltage $V_S$ is present as a single potential at the cathode of diode 16. A reset voltage is applied at terminal 64 so as to reset ramp signal generator 11 as well as detector circuit 19, thereby initiating a cycle of operation. The constant potential at source 20, which is more positive than maximum $V_S$, causes diode 16 to be forward biased, and $V_S$ appears across diode 16 at nodal point 14. This condition is represented by the curve of FIG. 2 where $V_R$ is greater than $V_S$. After $V_S$ is established, ramp signal generator 11 starts a ramp signal which is supplied to terminal 52. Voltage dividing network 12 develops a linearly time-varying reference voltage $V_R$ of the desired characteristics and impresses it upon the cathode of diode 18. Diode 18 is reverse biased until such time as an equality between $V_S$ and $V_R$ occurs. At that instant, the anode of diode 16 becomes less positive than the cathode, and diode 16 becomes reverse biased. Diode 18 is now forward biased and $V_R$ appears thereacross at nodal point 14. Thus, a change in the voltage present at nodal point 14 occurs; that change is from a constant voltage $V_S$ to a time-varying voltage $V_R$. This condition is clearly indicated at position 80 on FIG. 2. Such a change must be detected to be of value.

Detector circuit 19 senses this voltage change. Referring again to FIG. 1, it can be seen that when the time-varying voltage $V_R$ appears at nodal point 14, it is conveyed through capacitor 62 to tunnel diode 60, thereby switching tunnel diode 60 into the higher of its two voltage states. For example, if $V_R$ represents a ramp signal having a total fall time of roughly four microseconds, tunnel diode 60 will have latched within one hundred nanoseconds. As tunnel diode 60 latches into its higher conducting state, a greater current is provided to the base of transistor 68, causing transistor 68 to produce an output. By coaction of the diode-resistor network 70 with the signal available from transistor 68, an output signal of desired characteristics is developed at terminal 72. The output signal available at terminal 72 may be used in conjunction with optical apparatus to give a visual indication of the information sensed by the threshold detector circuit, or it may be employed in further logical operations within an associated digital processor.

In summary, electronic circuitry for sensing an equality between a constant potential and a linearly time-varying potential has been demonstrated. The constant potential is developed by summing a plurality of voltage inputs across a voltage summing network. The constant potential is applied to a detector circuit. The time-varying potential is developed by means of a ramp signal generator and a voltage divider circuit. After establishing the constant potential, the comparison of that constant potential with the time-varying potential takes place. When an equality occurs between the two potentials, the time-varying potential is then made available to the detector circuit. The threshold detector circuit senses the change in potential thereby induced and produces an output. The output signal is then available for immediate use.

Figure 3:
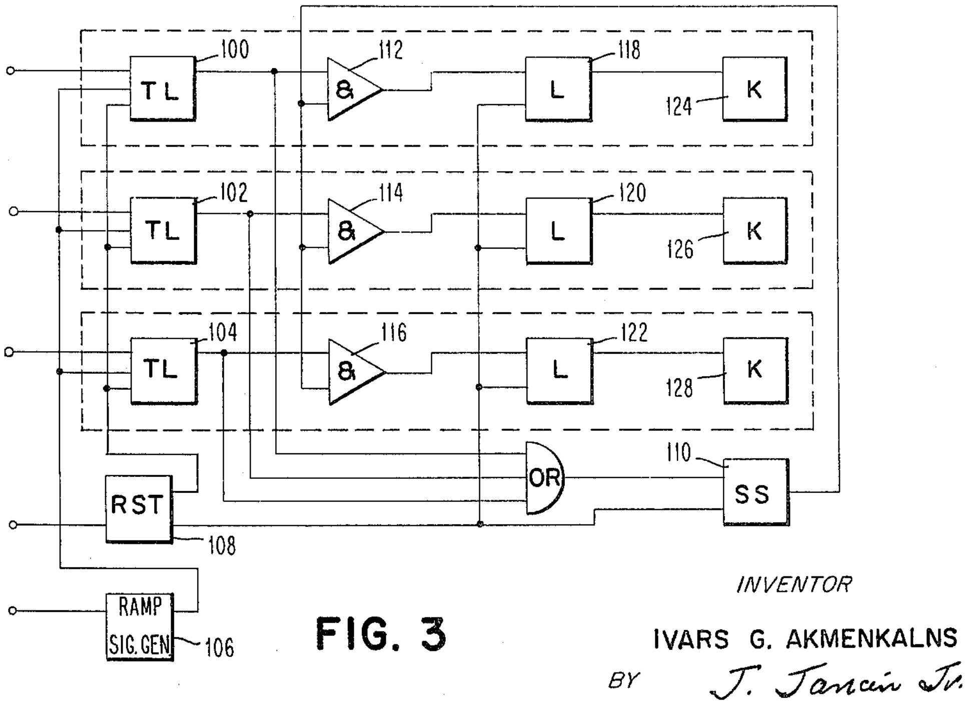
FIG. 3 shows a system employing a plurality of such threshold logic circuits.

Referring now to FIG. 3, a number of threshold logic circuits of the type shown in FIG. 1 are there combined to function as a system. The threshold logic circuits are numbered 100, 102, 104. A common ramp signal generator 106 and a common reset control circuit 108 provide respective signals to each of the threshold logic circuits 100, 102, 104. Each threshold logic circuit 100, 102, 104 can pulse a common single shot 110. Single shot 110 provides only one output per cycle to a plurality of AND circuits 112, 114, 116. Each AND circuit 112, 114, 116 is associated with an individual threshold logic circuit 100, 102, 104. Further associated with each AND circuit are latch circuits 118, 120, 122 and indicator circuits 124, 126, 128.

In operation, any one of these threshold logic circuits (100, for example) may sense an equality condition. When it does, it pulses and activates single shot 110. Single shot 110 then provides an output to all AND circuits 112, 114, 116. During the time that single shot 110 is on, outputs from any, or all, threshold circuits will be passed by the associated AND circuits to the output latches. However, when single shot 110 is off, no further signals will be supplied. Should it be desired, additional circuitry, not part of this invention, can provide an indication that more than one latch has been set during a given cycle of operation.

One classification system in which the circuitry of FIG. 3 could be employed would require an output of only one threshold logic circuit during a given cycle of operation. For instance, it could be employed in character recognition operations wherein an indication that one of a plurality of characters has been identified becomes meaningful. The parallel arrangement of threshold circuitry would be ideal for this function. Should two threshold logic circuits yield an equality condition signal during a given single shot cycle of operation, an error condition would be present. Such a condition would be sensed by the additional circuitry, not part of this invention, mentioned above. The provision of a common ramp signal generator 106 introduces an element of precision to the circuitry operation which would not be present if individual ramp signal generators were provided for the individual threshold logic circuits; that is, compounding of errors created by a plurality of ramp signal generators is eliminated.

Thus threshold logic circuitry which provides a positive indication of an equality condition between a constant voltage and a time-varying voltage has been demonstrated. Further, an operable system employing this type of circuitry has been shown.

While the invention has been particularly shown and described with reference to a preferred embodiment thereof, it will be understood by those skilled in the art that various changes in form and details may be made therein without departing from the spirit and scope of the invention.

I claim:

1. A threshold logic circuit comprising:
means for summing a plurality of input voltages into a single input voltage,
said summing means comprising a network of parallel-wired resistors,
means for generating a linearly time-varying reference voltage,
said reference voltage generating means comprising a sawtooth voltage signal source in series with a voltage dividing network,
means connected to both said summing means and said reference voltage generating means for comparing said single input voltage with said reference voltage and passing said reference voltage upon equality between said single input voltage and said reference voltage,
said means for comparing and passing said reference voltage comprising a plurality of nonlinear conductive elements and a nodal point, individual ones of said conductive elements being connected between said nodal point and in series respectively with said summing means and said reference voltage generating means,
means connected to said comparing and passing means for detecting the passage of said reference voltage and thereupon providing an output signal,
said last mentioned means comprising a capacitively coupled, nonlinear conductive element and an output transistor, said capacitively coupled, nonlinear conductive element connected between said output transistor and said comparing and passing means, whereby an output signal is provided upon detection of an equality between said single input voltage and said reference voltage.

2. A threshold logic circuit comprising:
an input voltage summing network for producing a single input voltage,
said network having a plurality of parallel-wired resistors in series with a first diode,
a linearly time-varying reference voltage generator for providing a voltage of substantially constant slope,
said generator comprising a sawtooth voltage signal source in series with a voltage dividing network, said network being in series with a second diode,
a nodal point connected between said first diode, a constant voltage source and said second diode for passing said reference voltage when said reference voltage is of a lower potential than said single input voltage,
an output signal generator connected to said nodal point for detecting an equality condition between said single input voltage and said reference voltage and providing an output upon said equality condition detection,
said output signal generator comprising a capacitively coupled, nonlinear conductive element connected to an output transistor.

3. A system employing threshold logic circuits comprising:
a plurality of threshold logic circuits in parallel for providing output signals indicative of equality between single summed input voltages developed by said circuits and a linearly time-varying reference voltage,
a common single shot circuit connected to said threshold logic circuits for providing an output signal in response to an output signal from one of said threshold logic circuits,
a plurality of gate circuits for passing output signals from said threshold logic circuits, in response to an output signal from said single shot circuit,
individual ones of said gate circuits being connected to individual ones of said threshold logic circuits,
and a plurality of latch circuits for storing output signals from said gate circuits,
individual ones of said latch circuits being connected to individual ones of said gate circuits.

4. A threshold logic system of the type described in claim 3 wherein said threshold logic circuits comprise:
means for summing a plurality of input voltages into a single input voltage,
said means comprising a network of parallel-wired resistors,
means for generating a linearly time-varying reference voltage,
said means comprising a sawtooth voltage signal source in series with a voltage dividing network,
means connected to both said summing means and said reference voltage generating means for comparing said single input voltage with said reference voltage and passing said reference voltage upon equality between said single input voltage and said reference voltage,
said means for comparing and passing said reference voltage comprising a plurality of nonlinear conductive elements and a nodal point, individual ones of said conductive elements being connected between said nodal point and in series respectively with said summing means and said reference voltage generating means,
means connected to said comparing and passing means for detecting the passage of said reference voltage and thereupon providing an output signal,
said last mentioned means comprising a capacitively coupled, nonlinear conductive element and an output transistor, said capacitively coupled, nonlinear conductive element connected between said output transistor and said comparing and passing means, whereby an output signal is provided upon detection of an equality between said single input voltage and said reference voltage.

5. A threshold logic system of the type described in claim 3 wherein said threshold logic circuits comprise:
an input voltage summing network for producing a single input voltage, said network having a plurality of parallel-wired resistors in series with a diode,
a linearly time-varying reference voltage generator for providing a voltage of substantially constant slope,
said generator comprising a sawtooth voltage signal source in series with a voltage dividing network,
said network being in series with a diode,
a nodal point connected between a constant voltage source and both said network and said generator for passing said reference voltage when said reference voltage is at a lower potential than said single input voltage,
an output signal generator connected to said nodal point for detecting an equality condition between said single input voltage and said reference voltage and providing an output upon said equality condition detection,
said output signal generator comprising a capacitively coupled, nonlinear conductive element connected to an output transistor.

References Cited by the Examiner

UNITED STATES PATENTS

| | | | |
|---|---|---|---|
| 2,736,878 | 2/1956 | Boyle | 328—146 |
| 2,949,546 | 8/1960 | McVey | 307—88.5 |
| 3,010,071 | 11/1961 | Carlson | 328—186 |
| 3,047,812 | 7/1962 | Brown | 328—147 |
| 3,086,125 | 4/1963 | Gumin et al. | 307—88.5 |
| 3,141,097 | 7/1964 | Grubb | 307—88.5 |

ARTHUR GAUSS, *Primary Examiner.*

B. P. DAVIS, *Assistant Examiner.*